United States Patent [19]
Lai

[11] Patent Number: 6,079,407
[45] Date of Patent: Jun. 27, 2000

[54] VENTILATOR HOOD FOR A STOVE

[76] Inventor: Hung-Chih Lai, No. 51, Shui-Tou Lane, Sec. 2, Chung-Ho St., Hsin-Sheh Hsiang, Taichung Hsien, Taiwan

[21] Appl. No.: 09/415,141

[22] Filed: Oct. 8, 1999

[51] Int. Cl.[7] .................................................. F24C 15/20
[52] U.S. Cl. ................................. 126/299 E; 55/DIG. 36
[58] Field of Search ................... 126/299 E; 55/DIG. 36

[56] References Cited

U.S. PATENT DOCUMENTS

| | | | |
|---|---|---|---|
| 4,787,114 | 11/1988 | Muckler et al. | 126/299 E |
| 5,394,861 | 3/1995 | Stegmaier | 55/DIG. 36 |

*Primary Examiner*—Carroll Dority
*Attorney, Agent, or Firm*—William E. Pelton, Esq.

[57] ABSTRACT

A ventilator hood for a stove includes a separator, a housing having a back plate, a top plate and two side plates and an inlet formed by an inclined bottom plate and a hood. A passage is defined between the hood and the inclined bottom plate. A guiding plate is attached to the hood and has a groove defined therein. A W-shaped screen is attached to the guiding plate in the passage. The inclined bottom plate and the back plate form the separator having a drain hose, an oil hose and an inlet hose attached thereto. The inlet hose includes at least one branch with each having a nozzle attached thereto. A deflector plate corresponding to each nozzle is attached to the groove in order to form a water curtain when the water spouts from the nozzle.

4 Claims, 7 Drawing Sheets

VENTILATOR HOOD FOR A STOVE

BACKGROUND OF THE INVENTION

1. Field of the Invention

The present invention relates to a ventilator hood, and more particularly to a ventilator hood which has a water cleaner.

2. Description of Related Art

A conventional ventilator hood for a stove in accordance with the prior art shown in FIGS. 6–7 comprises a body (40) and an inlet (50) having a heating plate (51) mounted on the underside of the body (40) to allow an oily air mixture created by a stove to pass therethrough. A sprayer (70) is mounted in the underside of the body (40) for injecting water to separate the oil from the oily air mixture that passes through the inlet (50).

A separator (60) is located under the sprayer (70) and has a baffled path (61) defined therein for separating the oily air mixture delivered from the sprayer (70) into oil and air. A reservoir (80) is located under the separator (60) to receive the separated oil and the water released from the sprayer (70) through the separator (60).

An outlet (90) is mounted on the underside of the body (40) and communicates with the separator (60) for exhausting the air therefrom. At least one motor (62) is mounted on the body (40), and the associated motor (62) drives at least one fan (63) for discharging the air delivered through the outlet (90) to outside.

There are several disadvantages to such an arrangement in the conventional ventilator hood for a stove, such as:

1. A large size, the conventional ventilator hood is large because the baffled path (61) of the ventilator hood is long and thick. Therefore, the shape of the ventilator hood is not attractive and is not suitable for an ordinary family.

2. Suction not adequate, the suction of the fan (63) passes through a long baffled path (61) in order to reach the inlet (50). Therefore, the suction at the inlet (50) is not adequate.

3. A complicated structure, the conventional ventilator hood is made of many materials because the structure of the conventional ventilator hood is complicated. Therefore, it will increase cost and be difficult to repair.

4. Condensed oil cannot be effectively drained to the reservoir (80). The inlet (50) has a heating plate (51) that is mounted on the underside of the body (40) to prevent condensing oil from making the inlet (50) dirty. The heating plate (51) not only reduces the inlet (50) area but also consumes extra electricity.

The present invention has arisen to mitigate and/or obviate the disadvantage of the conventional

SUMMARY OF THE INVENTION

In accordance with one aspect of the present invention, a ventilator hood for a stove includes a housing, an inlet and a separator. The housing includes a back plate, a top plate and two side plates. The inlet is formed by an inclined bottom plate and a hood and is inverted V-shaped. A passage is defined between the hood and the inclined bottom plate. A back plate is attached to the hood and has a groove defined therein. A W-shaped screen is attached to the back plate and received in the passage. The inclined bottom plate and the back plate form the separator which has a drain hose, an oil hose and an inlet hose attached thereto. The inlet hose includes at least one branch with each having a nozzle attached thereto. At least one deflector plate is attached to the groove and aligned with the nozzle in order to make a water curtain when the water spouts from the nozzle.

Further benefits and advantages of the present invention will become apparent after a careful reading of the detailed description with appropriate reference to the accompanying drawings.

DETAILED DESCRIPTION OF THE INVENTION

Figure 1:
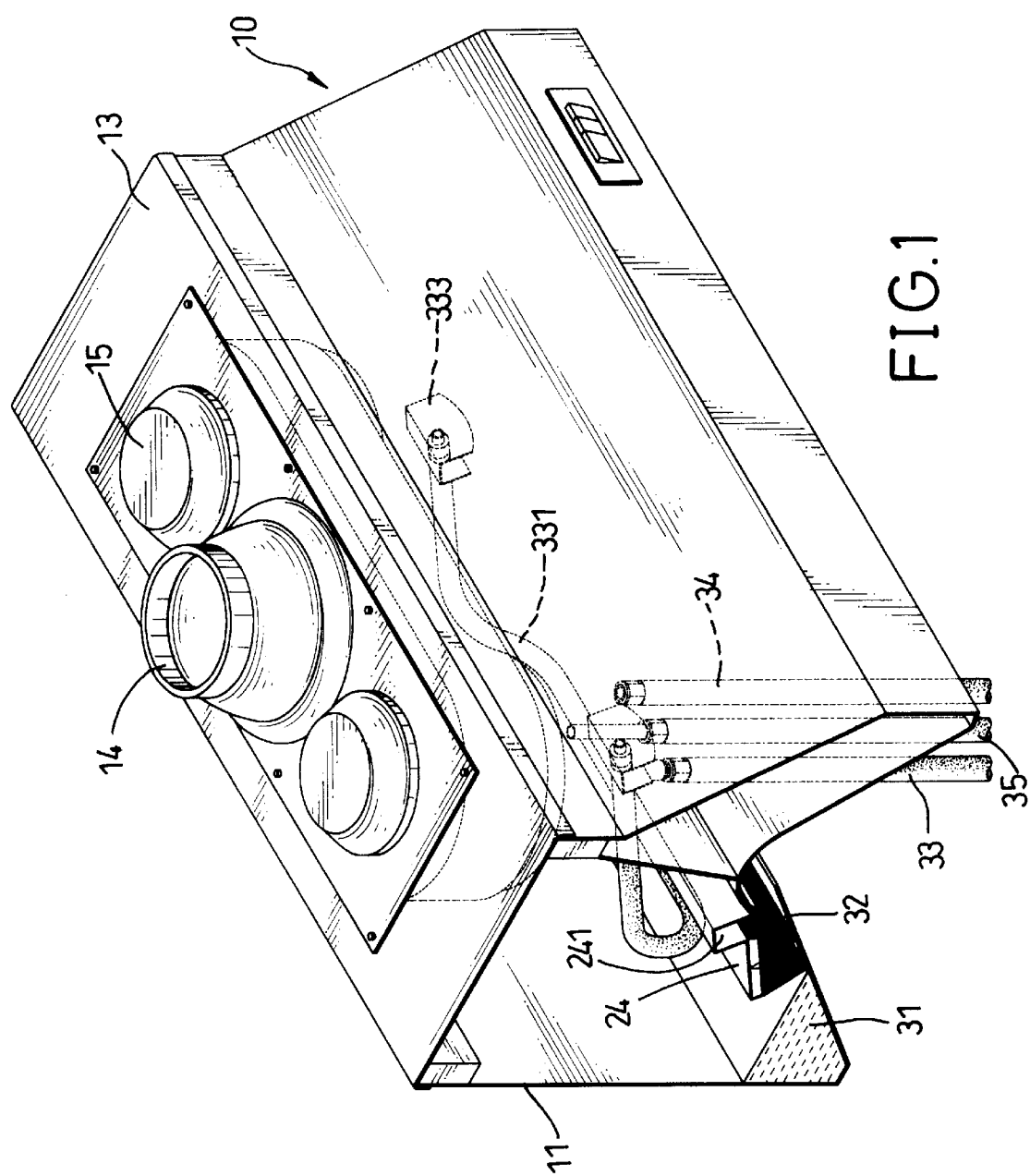
FIG. 1 is a perspective view of a ventilator hood for a stove in accordance with the present invention.
Figure 2:
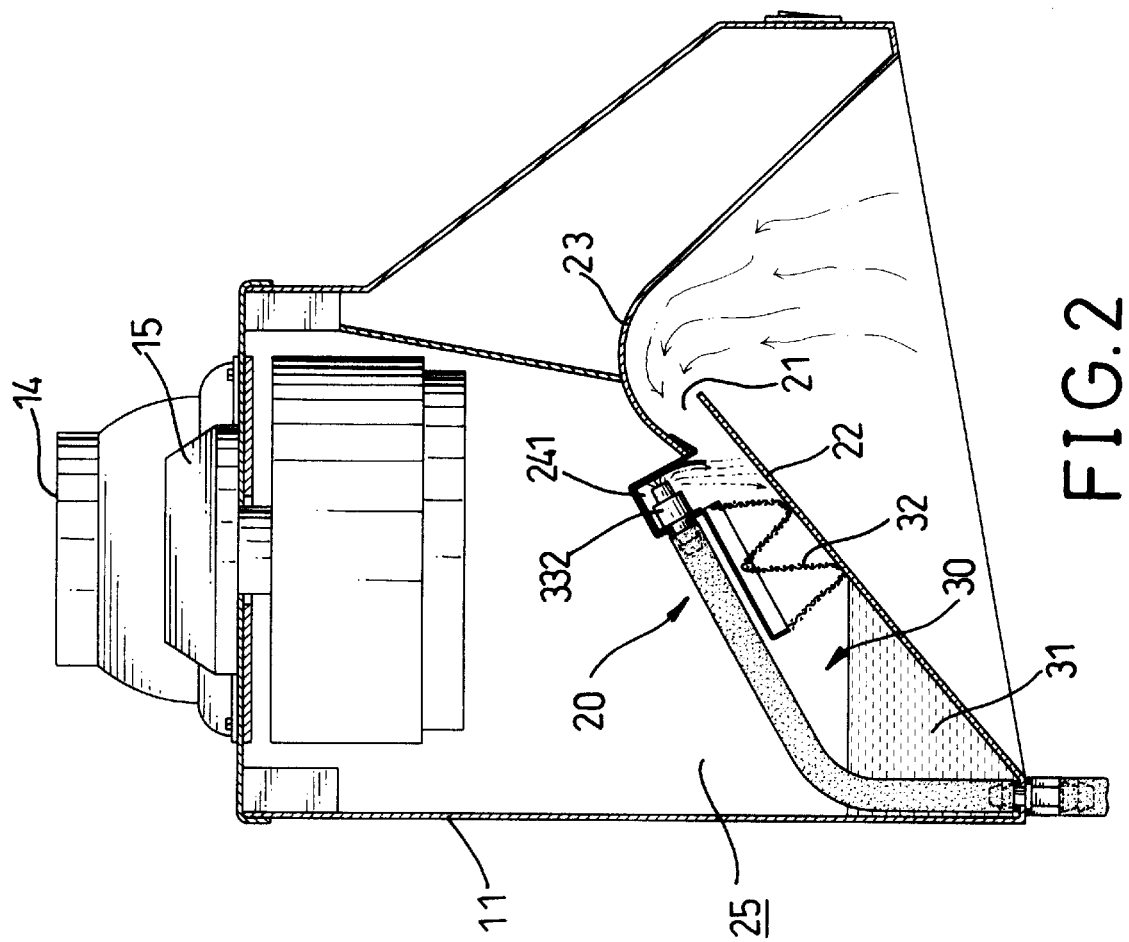
FIG. 2 is a side cross section plan view of the ventilator hood for a stove in FIG. 1.
Figure 3:
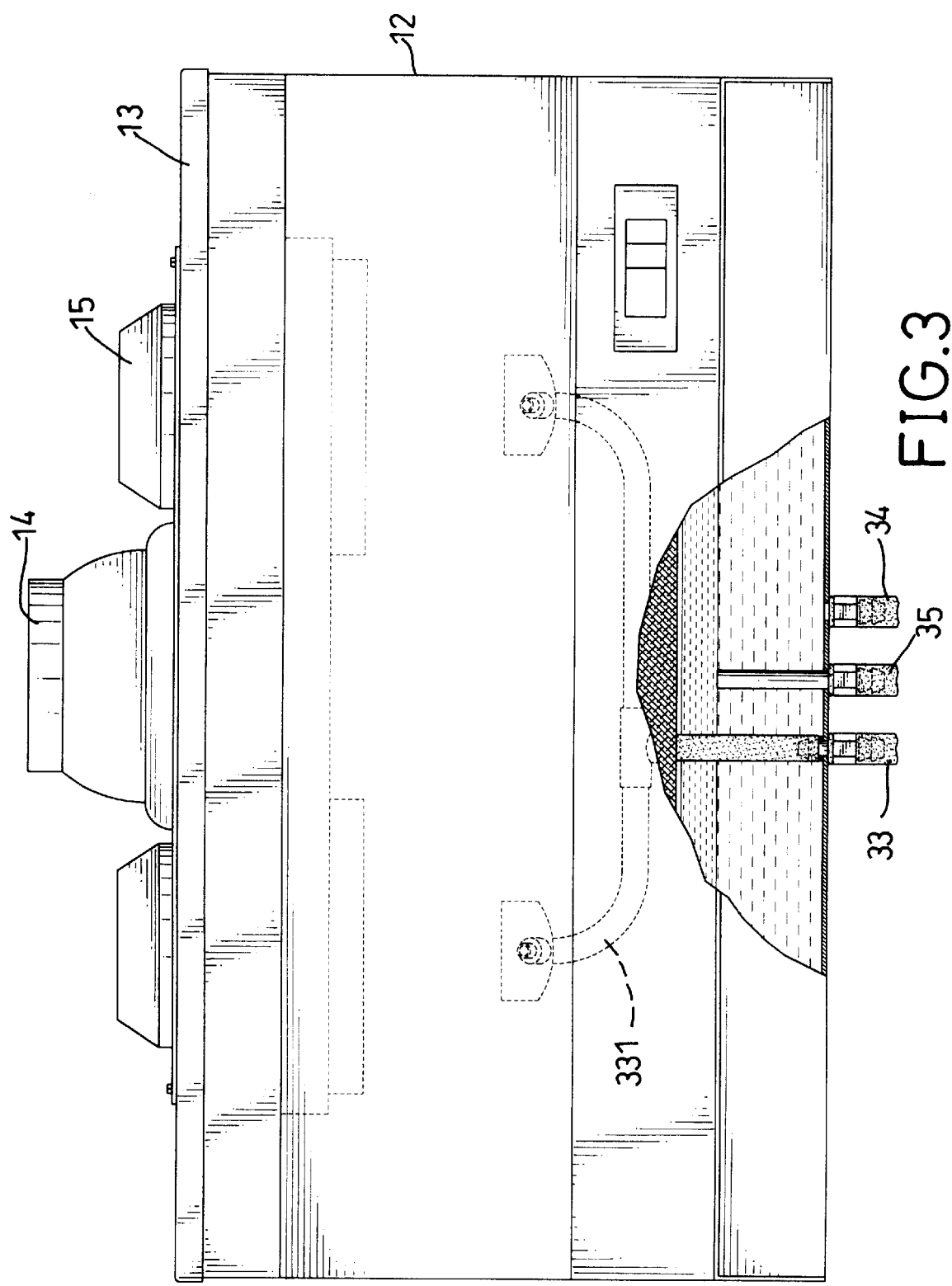
FIG. 3 is an operational front plan view in partial section of the ventilator hood for a stove in FIG. 1.

Referring to the drawings and initially to FIGS. 1–3, a ventilator hood for a stove in accordance with the present invention comprises a housing (10) including a back plate (11), two side plates (12) and a top plate (13) abutting each other. The top plate (13) contains at least one exhaust port (14) and at least one motor (15) attached thereto. The motor (15) and the fan (not shown) supply the suction for the ventilator. An inlet (20) is formed in the housing (10) above the stove and includes an inclined bottom plate (22) extending from the back plate (11) and a hood (23) extending from the top plate (13). A passage (21) is formed between the inclined bottom plate (22) and the hood (23). A guiding plate (24) is attached to the hood (23) and has a groove (241) defined therein. An exhaust chamber (25) communicates with the passage (21) and the exhaust port (14) in order to exhaust the clean air that has been filtered.

Figure 4:
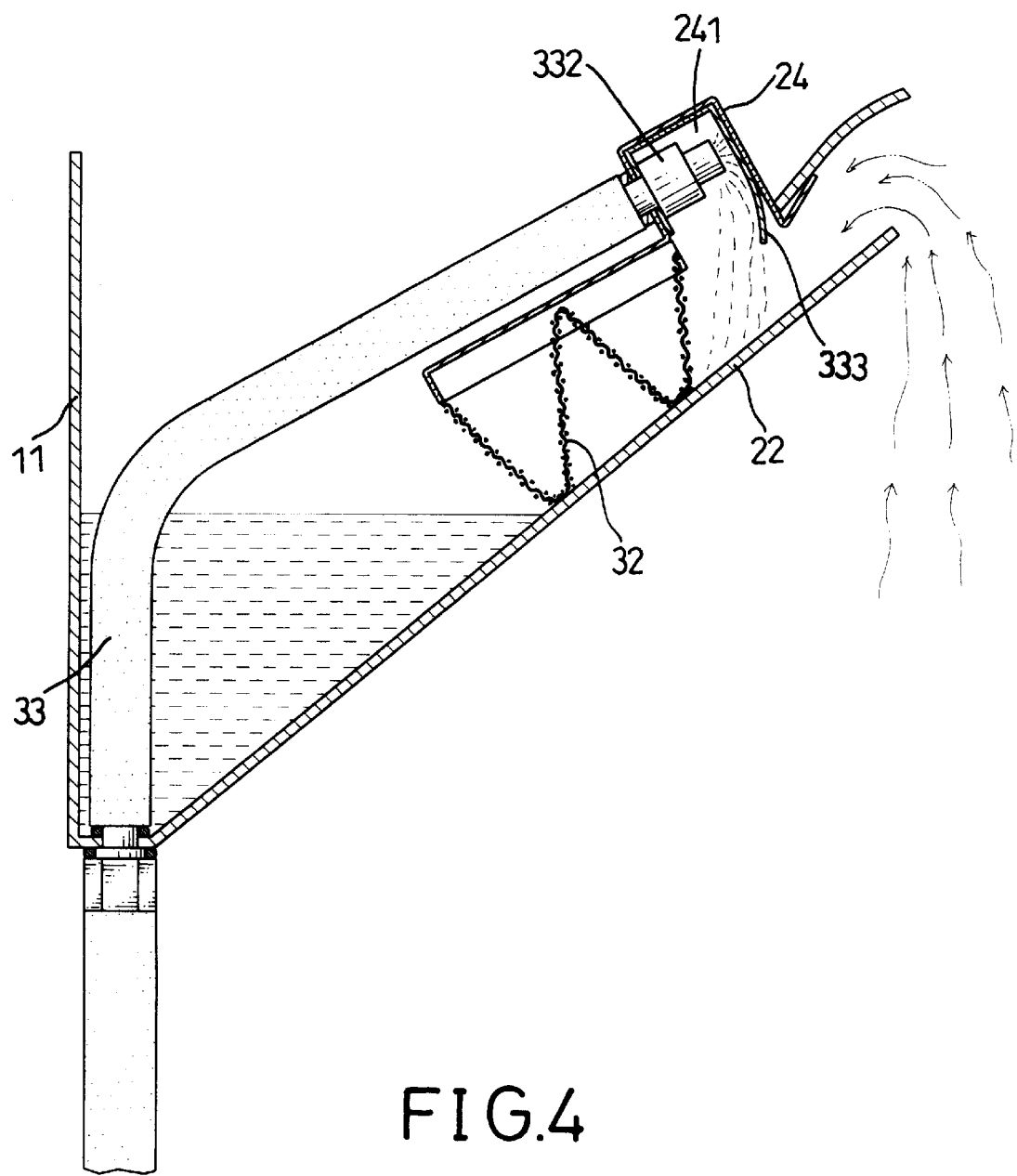
FIG. 4 is an operational side plan view in partial section of the ventilator hood for a stove in FIG. 1.
Figure 5:
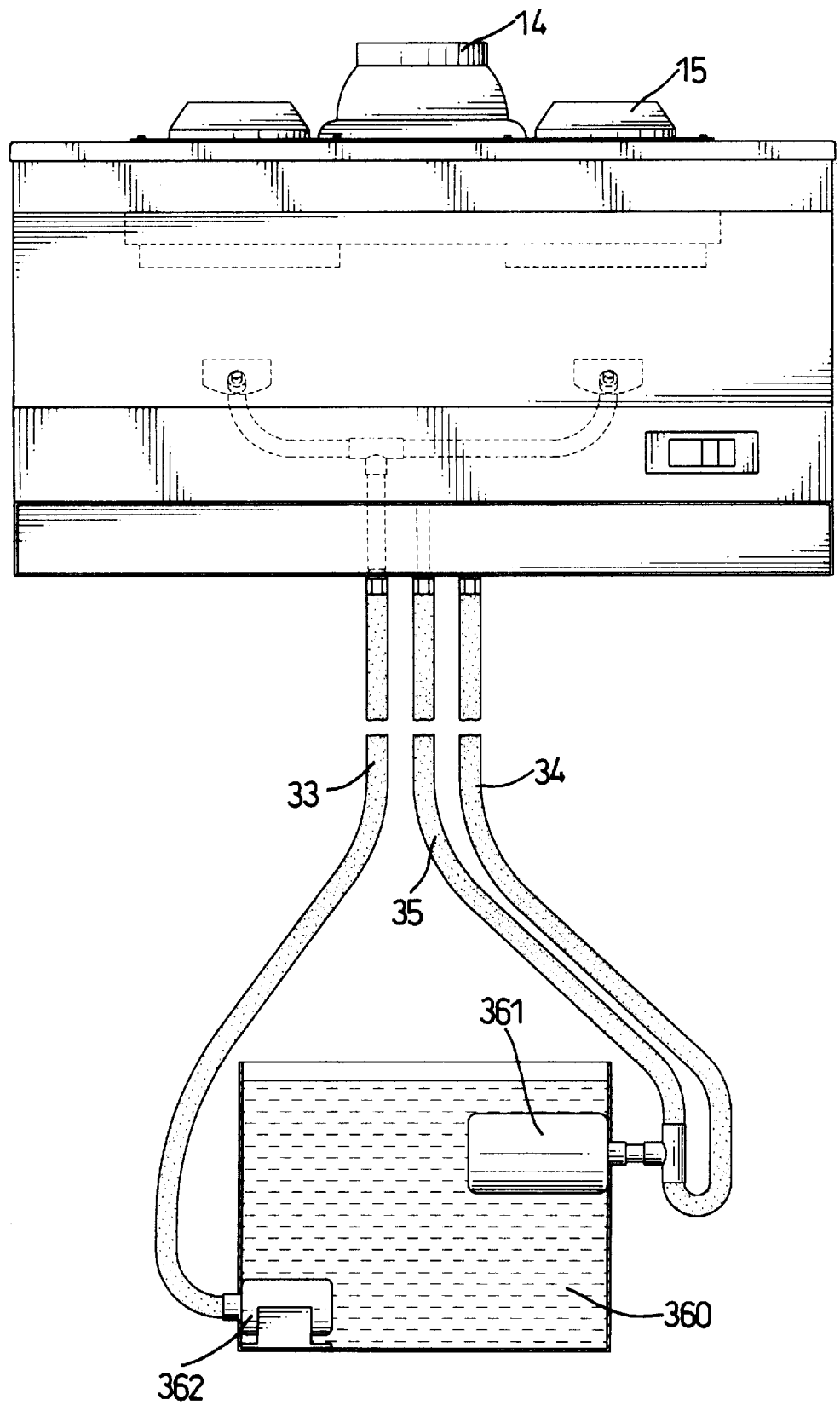
FIG. 5 is a front plan view in partial section of the ventilator hood for a stove in FIG. 1.
Figure 6:
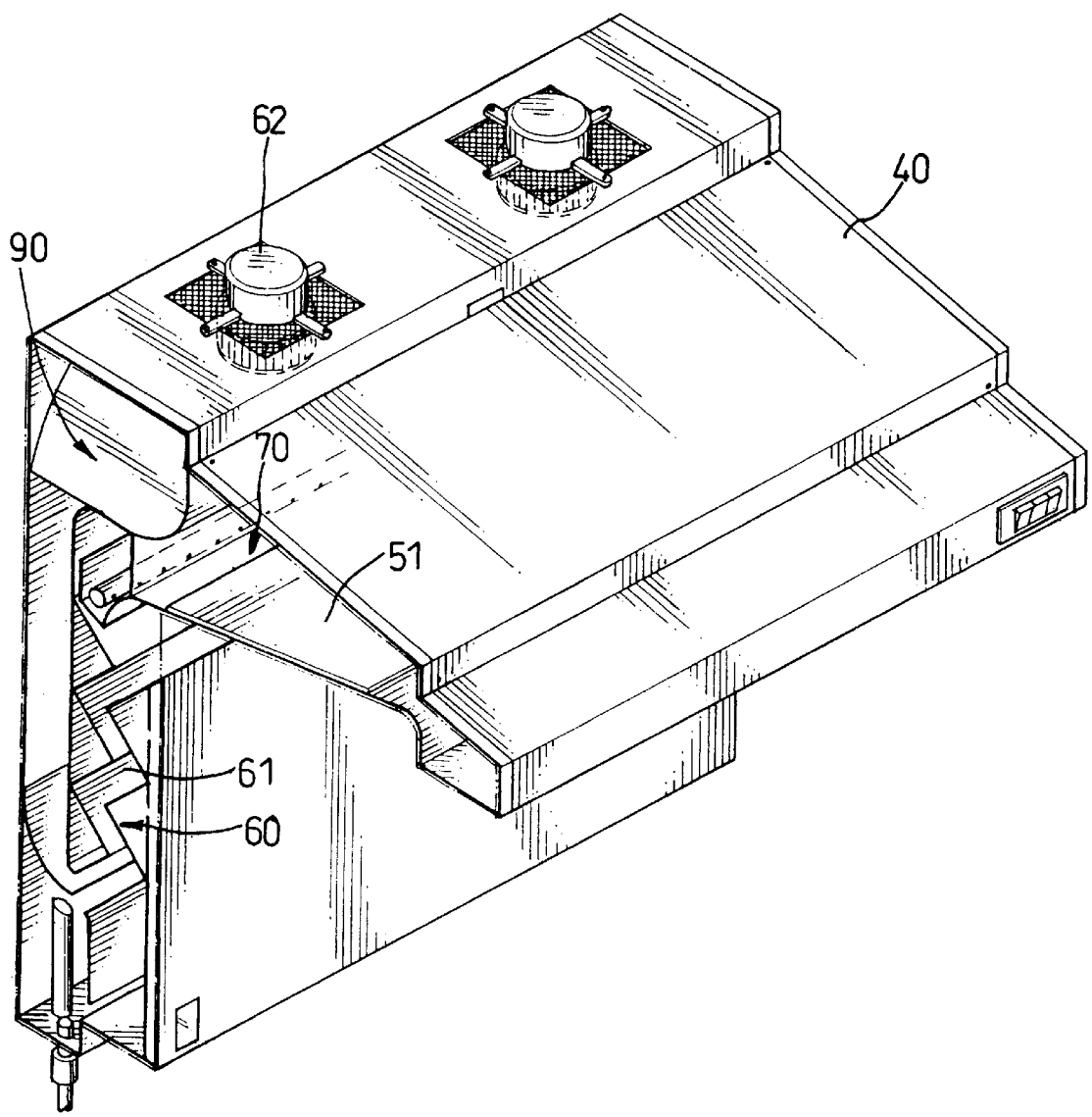
FIG. 6 is a perspective view in partial section of a conventional ventilator hood for a stove in accordance with the prior art.
Figure 7:
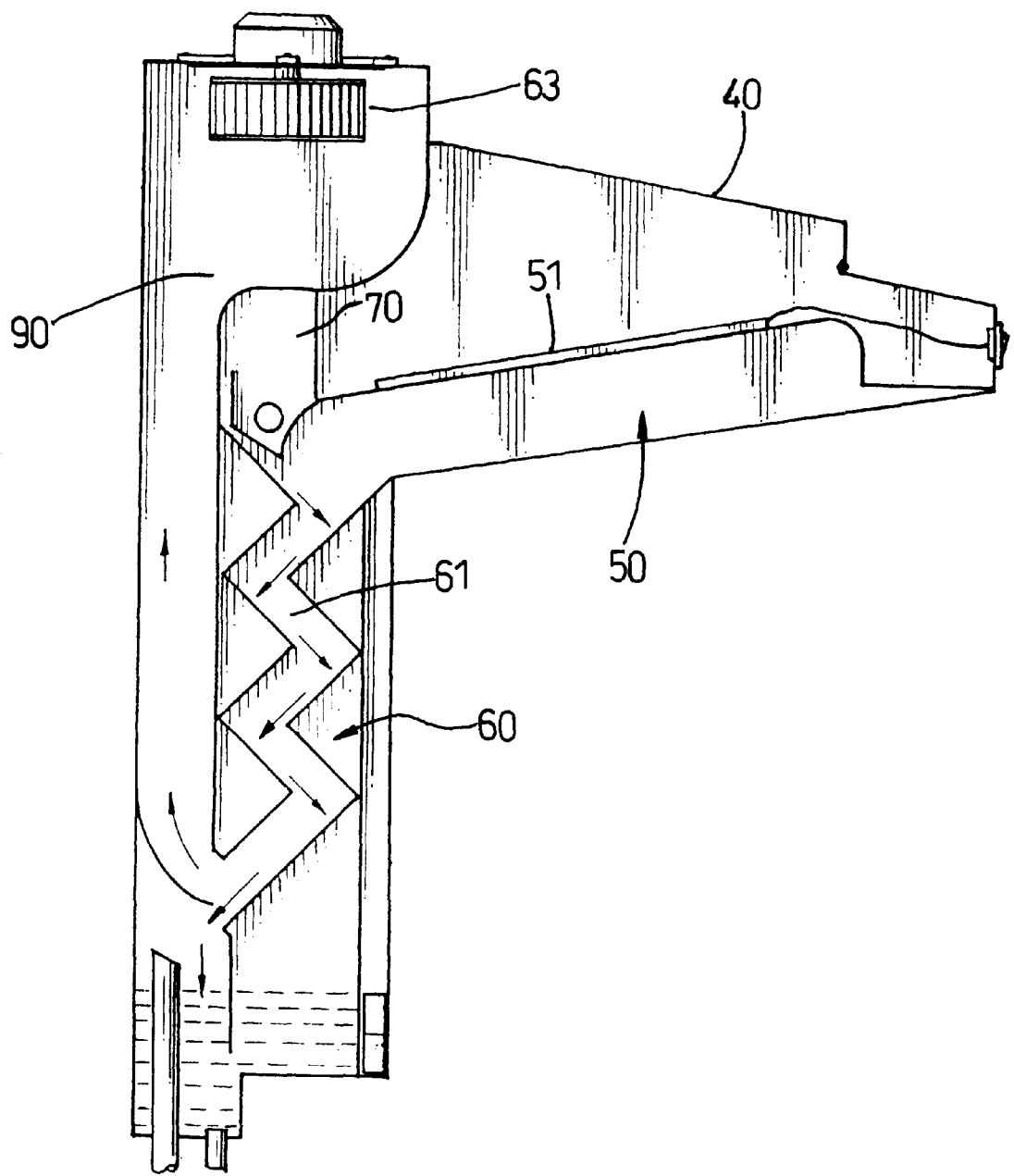
FIG. 7 is a side cross sectional plan view of the conventional ventilator hood for a stove in FIG. 5.

A separator (30) is defined between the inclined bottom plate (22) and the back plate (11) inside the housing (10). A W-shaped screen (32) is attached to the guiding plate (24) in the passage (21). A drain trough (31) is defined under the separator (30) and has an inlet hose (33) that extends therethrough. The inlet hose (33) includes at least one branch (331) with each having a nozzle (332) attached thereto and received in the groove (241) of the guiding plate (24). Referring to FIG. 4, A deflector plate (333) corresponding to each nozzle (332) is attached to the groove (241). The deflector plate (333) is curved toward the screen (32). The drain trough (31) further includes a drain hose (34) and an oil hose (35) each having an opening in the drain trough (31). The opening of the oil hose (35) is higher than that of the drain hose (34). Therefore, the oil in the drain trough (31) can drain easily because the oil floats on the water.

The ventilator hood for a stove further includes a tank (360) having a filter (361) connected to the tank (360) and a submerged pump (362) mounted in the tank (360). The drain hose (34) and the oil hose (35) are both connected to the filter (361) and the inlet hose (33) is attached to the submerged pump (362). By such an arrangement, the water can be recovered from the ventilator hood and recycled.

Referring to FIG. 2 and FIG. 4, by operating such an arrangement, the oily air mixture generated by the stove can be sucked into the passage (21) because the inlet (20) is an inverted V-shaped. The deflector plate (333) in front of the nozzle (332) is curved so that the water curtain formed by the deflector plate (333) curves toward the screen (32). The deflector plate (333) and resultant water curtain also serve to guide the oily air mixture. Some of the oil is separated from the oily air mixture and flows into the drain trough (31) along the inclined bottom plate (22) because of the condensing effect of the water curtain. The remainder of the oil is filtered by the W-shaped screen (32). Therefore, the air passing into the exhaust chamber (25) after passing through the water curtain and the screen (32) contains virtually no oil. The air discharged through the exhaust port (14) is clean.

As mentioned above, the ventilator hood in accordance with the present invention for a stove has the follow advantages.

1. Good condensing effect; referring to FIG. 4, the deflector plate (333) is attached in front of the nozzle (332). Therefore, the deflector plate (333) forms a slice of water curtain when the water spouts out of the nozzle (332). The water curtain covers all of the screen so that the oily air mixture that is sucked into the passage (21) can be condensed fully.

2. Double effect of the screen (32); referring to FIG. 2, the screen (32) of the present invention is W-shaped. Therefore, the screen (32) filters the oily air mixture four times as the oily air passes therethrough.

3. Oily air mixture does not overflow; referring to FIG. 2, the inlet (20) of the present invention is an inverted V-shaped and is formed by the inclined bottom plate (22) and the hood (23). The inlet (20) is a large area so the oily air mixture can be sucked into the passage (21) and not overflow around the front edge of the hood (23) or the bottom of the side plates (12).

Although the invention has been explained in relation to its preferred embodiment, it is to be understood that many other possible modifications and variations can be made without departing from the spirit and scope of the invention as claimed.

What is claimed is:

1. A ventilator hood for a stove comprising:

a housing (10) having a back plate (11), two side plates (12) and a top plate (13) abutting one and others, said top plate (13) containing at least one exhaust port (14) and at least one motor (15) attached thereto;

an inlet (20) received in said housing (10) and formed by an inclined bottom plate (22) extending from said back plate (11), a hood (23) extending from said top plate (13) and a passage (21) formed between said inclined bottom plate (22) and said hood (23);

an exhaust chamber (25) communicating with said passage (21) and said exhaust port (14);

a guiding plate (24) mounted on said hood (23) and having a groove (241) defined therein;

a separator (30) defined between said inclined bottom plate (22) and said back plate (11) and inside said housing (10);

a W-shaped screen (32) attached to said guiding plate (24) and received in said passage (21);

a drain trough (31) defined under said separator (30) and having an inlet hose (33) extending therethrough, said inlet hose (33) including at least one branch (331) with each having a nozzle (332) attached thereto and received in said groove (241) of said guiding plate (24); and a deflector plate (333) corresponding to each nozzle (332) attached to said groove (241).

2. The ventilator hood for a stove in accordance with claim 1, wherein said drain trough (31) includes a drain hose (34) and an oil hose (35) each having an opening attached thereto.

3. The ventilator hood for a stove in accordance with claim 2, wherein the height of said opening of said oil hose (35) is higher than that of said drain hose (34).

4. The ventilator hood for a stove in accordance with claim 1, wherein said deflector plate (333) is curve toward said screen (32).

* * * * *